July 8, 1969 R. P. CROWLEY 3,453,811
CHROMATOGRAPHIC COLUMNS WITH PARTITION ELEMENTS THEREIN
Original Filed June 7, 1967 Sheet 1 of 2
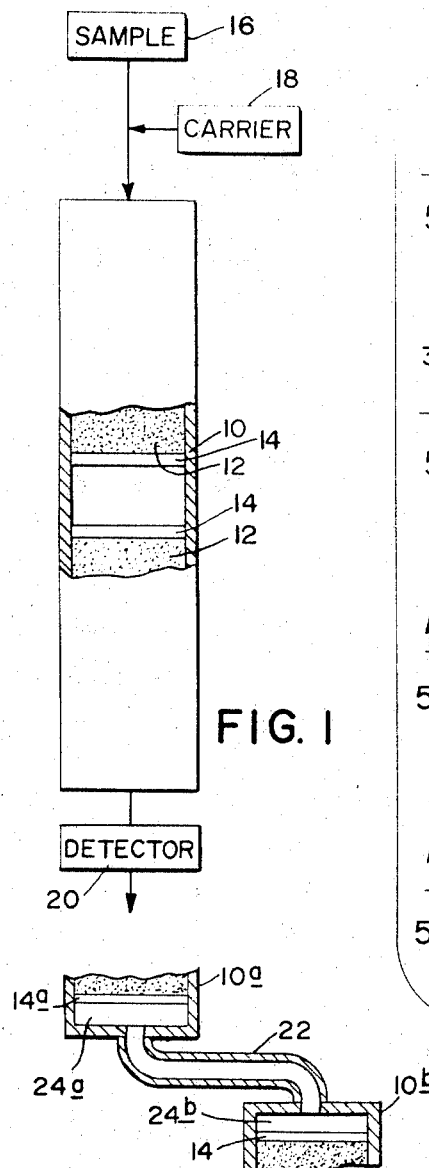
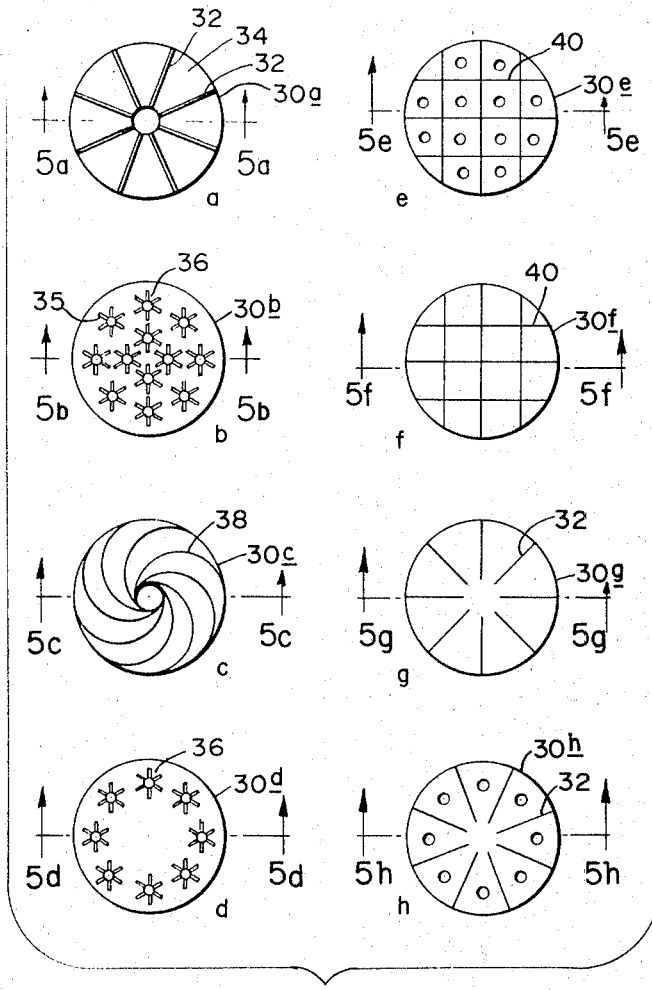
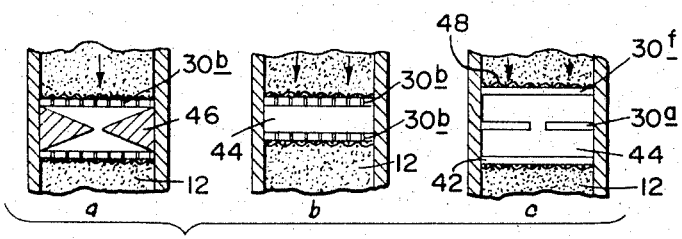
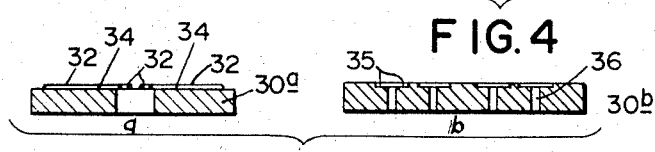
INVENTOR.
RICHARD P. CROWLEY
BY Richard P. Crowley
ATTORNEY

INVENTOR
RICHARD P. CROWLEY
BY
ATTORNEYS

United States Patent Office 3,453,811
Patented July 8, 1969

3,453,811
CHROMATOGRAPHIC COLUMNS WITH PARTITION ELEMENTS THEREIN
Richard P. Crowley, Milton, Mass., assignor to Abcor, Inc., Cambridge, Mass., a corporation of Massachusetts
Continuation of application Ser. No. 644,313, June 7, 1967. This application May 3, 1968, Ser. No. 726,612
Int. Cl. B01d 15/08
U.S. Cl. 55—386
23 Claims

ABSTRACT OF THE DISCLOSURE

An improved chromatographic column is described which column contains separatory material therein for the separation of a sample stream into one or more chromatographic fractions and disposed in the column are one or more partition elements or baffles to enhance the resolving power of the column. The improvement described includes the use of projections or grooves on the upstream face of one or more partition elements or baffles to control the flow path of the sample stream striking the upstream face. The projection or grooves may radially extend from about one or more flow passages in the partition element in order to prevent the flow of the gas along unconfined paths thereby providing better control and enhanced resolving power in such an improved chromatographic column.

---

This application is a continuation of my prior copending case Ser. No. 644,313, filed June 7, 1967, and now abandoned.

Background of the invention

Chromatography comprises the technique of passing a sample mixture through a chromatographic column and employing the different selective affinities of the fraction in the sample stream in relation to the separatory material within the column to separate the sample stream. The fixed stage of the column, that is the separatory material can be a liquid or a solid while the mobile or moving phase may be a gas as in gas chromatography or a liquid as in liquid chromatography. A number of different combinations may be employed in order to separate the sample stream, for example, gas-liquid, gas-solid, liquid-liquid or liquid-solid combinations may be employed as is well known. In the past it has been difficult to scale up relatively small diameter for example, ¼ inch chromatographic columns to larger size diameter columns, say four inches or over due to the rapid diminution in resolving power of the column as the diameter increases. Various baffles and combinations of baffles or partition elements have been suggested to improve the separatory ability of both gas and liquid chromatographic columns. U.S. Patent No. 3,250,058 issued Apr. 10, 1966 to R. F. Baddour describes for example, the combination of a gas collecting doughnut type baffle and a gas distributing baffle, while U.S. Patent No. 3,310,392 to S. W. Melpolder discloses a particular combination of baffles to improve the resolving power of a chromatographic column, and the baffles are designated as gas collecting, gas mixing and gas distributing plates. In the partition elements or baffles described to date, the fluid sample stream flows against the upstream face of the baffle and is radially mixed by a doughnut type baffle as it passes through the central passageway and then the mixed fluid sample stream is distributed back into the separatory material of the column by the use of a distributing baffle, e.g., characterized by a plurality of flow passages therein. Typically, a screen is employed on the upstream face of the baffle in order to prevent the separatory material from blocking any of the flow passages in the baffle, otherwise the fluid sample stream flows in unconfined paths against the face of the collecting, mixing and distributing baffles. For purposes of this invention both the Baddour and Melpolder patents are hereby incorporated by reference in their entirety in this application.

Brief summary of the invention

My invention is directed toward an improved chromatographic column containing partition elements wherein the upstream face of the partition elements has one or more projections or grooves on the face thereof of predetermined position or depth in order to control the flow path of the sample stream across at least a portion of the upstream face of the partition element. In particular, my invention relates to the use of such upstream control means on the face of the partition elements wherein the partition elements are employed in combination with a mixing space without separatory material between the elements.

My control means prevents the unconfined wandering of the fluid sample stream against the upstream face of the partition element and channels and controls the flow path as desired, thereby optimizing and enhancing the resolving power of chromatographic columns containing that partition element. For example, prior partition elements have not controlled the flow path against the upstream face but merely relied upon pressure drop, the position of the flow passages and the like. However, in practice, depending upon many factors such as the type of packing and its relationship to the upstream face of the partition element, the fluid sample stream may not move directly toward the flow passages desired or toward the nearest flow passage in a straight line. Accordingly, my control means is used to provide defined areas of influence across all or a portion of the partition element's upstream face so that control of the fluid sample stream is maintained to a greater extent than heretofore possible. My control means are particularly applicable to relatively large diameter columns of six inches or more where it may be necessary to insure that there is a complete mixing of the fluid sample stream in the shortest possible length to avoid irregular chromatographic fronts.

In connection with my invention, any partition elements alone or in combination may be employed with my control means. For example, in one embodiment, a doughnut type partition element may be employed in combination with a sieve plate such as a porous ceramic, glass or metal particle or fiber plate, as the distributing plate, and without separatory material between the partition elements. My projections and grooves may extend radially from the flow passages in straight line, spiral or other form, and may be employed upon one or more upstream faces of a sandwich containing two or more partition elements. For example, my projections and grooves may extend straight and radially out from the central flow passage of a doughnut type element or extend out a predetermined distance from one or all or substantially all flow passages of a sieve plate element used both as gas collecting and mixing plates while the following sieve plate, disc or other gas distributing partition elements does not have my projections or grooves thereon. That is, it is possible to employ my projections and/or grooves on the collecting, mixing and distributing partition elements or only on any one or two of them. Once the fluid sample stream has been radially mixed and channeled to the proper flow passage to obtain a defined area of influence, then the unconfined flow of the radially mixed fluid sample stream against the face of the distributing or even the mixing partition element may be desired in certain circumstances.

As described, doughnut type partition elements are not employed alone in chromatographic columns since they fail to enhance the resolving power of the column, but rather promote central channeling of the fluid sample stream, but they are effectively used in combination with a distributing element such as a sintered plate. Partition elements containing a plurality of flow passages may however, be employed alone in a chromatographic column though preferably they are employed in combination so that one of the upstream partition elements serves as a gas collecting and mixing element while the following element usually containing substantially non-aligned flow passages and which may or may not be separated by separatory material serves as the distributing partition element.

*Brief description of the drawings*

FIG. 1 is a brief schematic illustration of a typical chromatographic column;

FIG. 2 is a fragmentary illustration showing the joining of two chromatographic column sections;

FIG. 3 is a plan view of a series of various partition elements *a* through *h* containing projections or grooves on the surface thereof and in accordance with the teachings of this invention;

FIG. 4 is an enlarged fragmentary section of a chromatographic column showing various combinations of the partition elements of FIG. 3; and FIGS. 5a–5h are enlarged sectional views of the embodiments of FIG. 3 taken along the lines 5—5;

FIG. 6 is a top plan view of the partition element as shown in FIG. 5a.

*Preferred embodiments of the invention*

Figure 6:
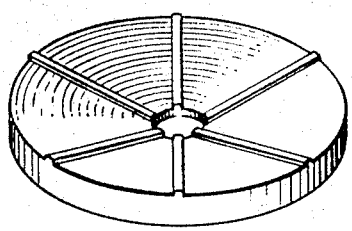

FIG. 1 shows a typical gas chromatographic column containing subdivided packed separatory material 12 within the column, such as crushed fire brick containing a thin liquid partitioning agent on its surface. The column 10 contains partitioning elements therein shown generally at 14. A fluid sample stream is introduced from a sample source 16 into the top of the column and is driven in an axial direction through the column by an inert carrier gas such as helium derived from a carrier source 18. On passing through the column, the gas sample stream which is a mixture of hydrocarbons like cis-transpentene is separated into its chromatographic fractions and the fractions are withdrawn from the bottom of the column and identified by a detector 20 which may be any sensing or detecting mechanism such as a thermo-conductivity cell, flame ionization detector, electron capture device or the like.

FIG. 2 illustrates the use of partitioning elements wherein the chromatographic column 10 comprises column sections 10a and 10b, joined by a tubular connector 22 which does not contain separatory material and wherein a partition element 14 is disposed adjacent the outlet of column 10a and adjacent the inlet of column 10b so as to provide mixing spaces 24a and 24b without separatory material. In FIGS. 1 and 2, my projections and grooves to control the flow path may be used respectively on one or more of the upstream faces of the partition element 14.

FIG. 3 illustrates various embodiments of my invention as employed on different partition elements. These partition elements are as heretofore described, used to induce lateral flow of the gas or liquid flowing axially through a chromatographic column. Partition elements which are generally used today normally, randomly redirect the flow of the sample stream which random flow may not always be as desired since some of the sample stream may even return to its original position in the column.

This is prevented by line control means such as by scoring or the use of upwardly extending projections or downwardly extending grooves in the upstream face of the partition elements used in chromatographic columns. A particular area of influence can be locally created to control accurately the flow path of the sample fluids and thereby prevent or inhibit undesired random distribution. My concept of control means in creating areas of definite influence may be used with a variety of partition elements and may be employed, for example, about some flow passages and not about others, in particular areas of the plate or partition elements, or in substantially the entire upstream face of the partition elements and may also be employed in all partition elements or only some of the partition elements. The improved partition elements will be described in particular with the use of ridges extending generally upward a predetermined amount such as ⅛ to ½ inch from the upstream face of the partition elements. However, the ridges may also be formed by grooves such as by scoring the upstream face of the partition element or when desired a mixture of grooves and ridges may be suitably employed on the upstream face of the partition element.

FIG. 3a shows a doughnut type partition element 30a subdivided into eight areas of influence 34 by radially extending ridge lines 32 on the upstream face of the element. FIG. 3b illustrates a sieve plate 30b having short grooves 35 radially extending outwardly from each flow passage 36 so that fluid sample streams falling within the area defined by the grooves will promote directional flow of the sample stream toward the flow passage from which the grooves extend and along the sectors of influence. FIG. 3c illustrates a doughnut type partition element 30c containing swirl type ridges 38 which extend from the outer peripheral edges of the partition element and swirl toward the central flow passage so that sample streams would be given a control swirling motion toward the central flow passage. FIG. 3d illustrates a baffle containing flow passages toward the outer periphery thereof. The baffle 30d has short radially extending ridges 36 extending from the flow passages. This partition element is particularly useful in combination with the partition elements 30a, 30b, 30c and/or 30e, 30e illustrates a sieve plate which includes a series of horizontal and rectangular ridges dividing the area about each flow passage into a defined rectangular area of definite influence. FIG. 3f illustrates a gas porous partition element 30f, for example, of sintered metal fibers, in which ridges 40 are employed to subdivide the sieve plate into definite areas of influence. FIG. 3g illustrates another gas porous sintered metal particle or fiber plate 30g which is subdivided into various segmatic portions of influence through the use of radial extending ridges 32 from the center of the plate. This partition element is particularly useful in combination with a doughnut type partition element and as a distributing element so that the radially mixed gases are deposited in the center of the partition element and then are subdivided into controlled areas of influence by ridges 32. FIG. 3h illustrates a baffle 30h having flow passages about the outer periphery thereof and which includes radial extended ridge lines 32 similar to element 30g. This element is particularly useful as a distributing element in combination with doughnut type elements or sieve plates.

FIG. 4a illustrates a particular combination of partition elements employing a sieve plate 30b as the gas collecting plate and another sieve plate spaced apart therefrom as the gas distributing element with a tapered funnel type or doughnut partition element 46 as the gas mixing element without separatory material between the two sieve plates. The tapered doughnut element 46 should have ridges or grooves on the upstream face thereof, the tapered nature of the element directs the gas collected by element 30b toward the central flow passage. FIG. 4b shows the use of a pair of sieve plates 30b in a close back to back relationship without separatory material therein to define a narrow disc like mixing space 44 between the elements. FIG. 4c illustrates the use of an upstream gas collecting porous sintered metal plate 42 in combination with a similar plate as the gas distributing plate to form a mixing space 44 without separatory material therebetween, but which contains therein a doughnut partition element 30a such as is illustrated in FIG. 3a. Screens 48 are employed to prevent the separatory material from entering the flow passages of the partition element. FIG.

Figure 5C:
Figure 5F:
Figure 5D:
Figure 5G:
Figure 5E:
Figure 5H:

5a is a cross-sectional enlarged view of a partition element 30a illustrating the raised ridges on the upstream surface of the partition element and the defined areas of influence. FIG. 5b is an enlarged cross-sectional modified view of the partition element 30b illustrating the use of a series of radially extended grooves 35 on the upstream face of the partition elements 36. FIGS. 5c through 5h are similarly cross-sectional enlarged views illustrating the use of alternative embodiments of grooves extending from the upstream face of the partition elements.

As described and illustrated, a variety of partition elements employed in chromatographic columns may be employed using ridges or grooves to define controlled areas of influence in circular, semi-circular, arcuate or rectangular grid type nature, thereby providing greater control over the confined particle of gas or liquid as it moves to a straight fronting or other device to enhance the separatory ability and resolving power of the column. Further as illustrated, my ridges and grooves may be formed by scoring, molding or other suitable techniques and they may be formed in straight or curved lines.

My concept has been disclosed with particular reference to the upstream face of the partition elements. However, it is possible to define areas of influence on the downstream side of the partition element. For example, when the fluid stream moves through the flow passages in the partition element, a portion of it may move laterally and it may be desirable to control the flow in this area. My invention has been illustrated in particular, in reference to an operation of a gas chromatographic column, however, my invention may also be employed in liquid chromatographic columns where partition elements are used.

What is claimed is:

1. In a column for the chromatographic separation of a fluid sample stream flowing through the column the combination which comprises:
   (a) separatory material within the column;
   (b) a partition element disposed within the column defining at least one flow passage and also having a uniformly smooth upstream face generally the entire surface of which is directly exposed to the fluid stream moving axially through the column and which flow passage is adapted to permit the flow of the fluid sample stream therethrough;
   (c) ridge means extending upwardly a short distance from the upstream face of the partition element, said means defining uniform areas of confinement about the flow passage and within said ridge means whereby the random flow of the fluid stream flowing against the upstream face of the partition element is confined within the area defined by the ridge means.

2. The column of claim 1 wherein the ridge means extending upwardly from the upstream face of the partition element are straight lines.

3. The column of claim 2 wherein the straight lines extend radially outward from about the flow passage.

4. The column of claim 1 wherein the ridge means are uniformly convoluted about the flow passage.

5. The column of claim 1 wherein the partition element is characterized by a plurality of flow passages therein and said ridge means are uniformly disposed about each flow passage.

6. The column of claim 5 wherein the ridge means are straight lines.

7. In a column for the chromatographic separation of a fluid sample stream flowing through the column the combination which comprises:
   (a) separatory material within the column;
   (b) a partition element disposed within the column defining at least one flow passage and also having a uniformly smooth downstream face and which flow passage is adapted to permit the flow of the fluid sample stream therethrough;
   (c) ridge means extending downwardly a short distance from the downstream face of the partition element, said means defining uniform areas of confinement about the flow passage and within said ridge means whereby the random flow of the fluid stream flowing across the downstream face of the partition element is confined within the area defined by the ridge means.

8. The column of claim 7 wherein the ridge means extending downwardly from the downstream face of the partition element are straight lines.

9. The column of claim 8 wherein the straight lines extend radially outward from about the flow passage.

10. The column of claim 7 wherein the ridge means are uniformly convoluted about the flow passage.

11. The column of claim 7 wherein the partition element is characterized by a plurality of flow passages therein and said ridge means are uniformly disposed about each flow passage.

12. The column of claim 11 wherein the ridge means are straight lines.

13. In a column for the chromatographic separation of a fluid sample stream flowing through the column the combination which comprises:
   (a) separatory material within the column;
   (b) a partition element disposed within the column characterized by a plurality of uniformly distributed flow passages throughout the face thereof, and also having a uniformly smooth upstream face generally the entire surface of which is directly exposed to the fluid stream moving axially through the column and which flow passages are adapted to permit the flow of the fluid sample stream therethrough;
   (c) groove means on the upstream face of the partition element extending downwardly into said partition element uniformly disposed about each flow passage and in communication therewith to define uniform areas of confinement about the flow passages whereby the random flow of the fluid stream moving axially through the column and across the upstream face of the partition element in controlled.

14. The column of claim 13 wherein the groove means on the partition element are straight lines.

15. In a column for the chromatographic separation of a fluid sample stream flowing through the column, the combination which comprises:
   (a) separatory material within the column;
   (b) a partition element disposed within the column defining at least one flow passage and also having a uniformly smooth upstream face, generally the entire surface of which is directly exposed to the fluid stream moving axially through the column and which flow passage is adapted to permit the flow of the fluid sample stream therethrough;
   (c) ridge means extending upwardly a short distance from the upstream face of the partition element, said means defining areas of confinement about the flow passage and within said ridge means whereby the random flow of the fluid stream flowing against the upstream face of the partition element is confined within the area defined by the ridge means.

16. The column of claim 15 wherein the ridge means extending upwardly from the upstream face of the partition element are straight lines.

17. The column of claim 16 wherein the straight lines extend radially outward from about the flow passage.

18. The column of claim 15 wherein the partition element is characterized by a plurality of flow passages therein, and said ridge means are disposed about each flow passage.

19. The column of claim 18 wherein the ridge means are straight lines.

20. In a column for the chromatographic separation of a fluid sample stream flowing through the column the combination which comprises:
   (a) separatory material within the column;

(b) a partition element disposed within the column having a plurality of flow passages therein and also having a uniformly smooth upstream face generally the entire surface of which is directly exposed to the fluid stream moving axially through the column and which flow passages are adapted to permit the flow of the fluid sample stream therethrough;

(c) straight lined groove means on the upstream face of the partition element extending downwardly into said partition element disposed about the flow passages and in communication therewith to define areas of confinement about the flow passages whereby the random flow of the fluid stream moving axially through the column and across the upstream face of the partition element is controlled.

21. In a column for the chromatographic separation of a fluid sample stream flowing through the column the combination which comprises:

(a) separatory material within the column;

(b) a partition element disposed within the column defining at least one flow passage therein and also having a uniformly smooth upstream face the entire surface of which is directly exposed to the fluid stream moving axially through the column and which flow passage is adapted to permit the flow of the fluid sample stream therethrough;

(c) convoluted groove means on the upstream face of the partition element extending downwardly into said partition element disposed about the flow passage, and characterized in that only one end of each groove is in communication with the flow passage to define areas of confinement about the flow whereby the random flow of the fluid stream moving axially through the column and across the upstream face of the partition element is controlled.

22. The column of claim 21 wherein the partition element is characterized by a plurality of flow passages therein.

23. In a column for the chromatographic separation of a fluid sample stream flowing through the column the combination which comprises:

(a) separatory material within the column;

(b) a first upstream partition element disposed within the column defining at least one flow passage therein and also having a uniformly smooth downstream face, ridge means extending downwardly a short distance from the downstream face of the partition element, said means defining areas of confinement about the flow passage and within said ridge means whereby the random flow of the fluid stream flowing across the downstream face of the partition element is confined with the areas defined by the ridge means;

(c) a second partition element axially spaced apart from and downstream of the first partition element characterized by a single central flow passage therein;

(d) a third downstream partition element axially spaced apart from the second partition element having a uniformly smooth upstream face, ridge means extending upwardly a short distance from the upstream face of the third partition element, said means defining areas of confinement about the flow passage and within said ridge means, whereby the random flow of the fluid stream flowing across the upstream face of the third partition element is confined within the area defined by the ridge means.

References Cited

UNITED STATES PATENTS

| 2,989,443 | 6/1961 | Martin | 55—67 X |
| 3,230,167 | 1/1966 | Golay | 55—386 X |
| 3,250,058 | 5/1966 | Baddour | 55—197 X |
| 3,310,932 | 3/1967 | Melpolder | 55—386 |
| 3,315,736 | 4/1967 | Carel | 55—197 X |
| 3,374,606 | 3/1968 | Baddour | 55—67 |

FOREIGN PATENTS 663,204   4/1967   Republic of South Africa.

REUBEN FRIEDMAN, *Primary Examiner.*

J. L. DE CESARE, *Assistant Examiner.*